United States Patent

Geiger et al.

[11] 3,883,500
[45] May 13, 1975

[54] PROCESS FOR THE MANUFACTURE OF INSULIN, ANALOGS AND DERIVATIVES THEREOF

[75] Inventors: Rolf Geiger, Frankfurt am Main; Georg Jager, Neuenhain, Taunus, both of Germany

[73] Assignee: Hoechst Aktiengesellschaft, Frankfurt am Main, Germany

[22] Filed: Oct. 29, 1973

[21] Appl. No.: 410,310

[30] Foreign Application Priority Data
Oct. 31, 1972 Germany............................ 2253327

[52] U.S. Cl. ............................................. 260/112.7
[51] Int. Cl. . C07c 103/52; A61k 17/04; C07g 7/00
[58] Field of Search........................ 260/112.7, 112.5

[56] References Cited
OTHER PUBLICATIONS
Du et al: Scientia Sinica, 10, 84-96 (1961).

Primary Examiner—Lewis Gotts
Assistant Examiner—Reginald J. Suyat
Attorney, Agent, or Firm—Curtis, Morris & Safford

[57] ABSTRACT
A method for making insulin and certain derivatives thereof from a compound of the formula (I)

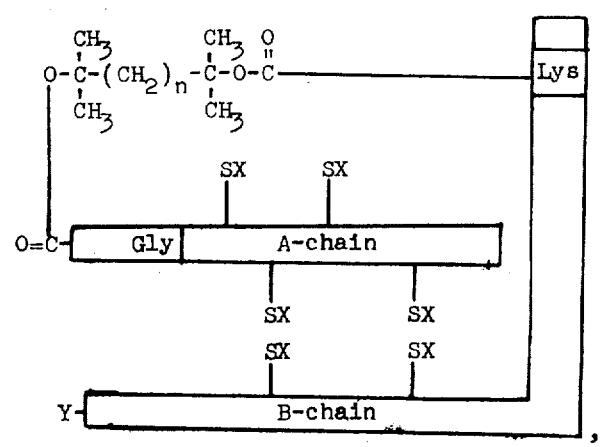

wherein X is hydrogen or an S-protective group and n is an integer from two to four, which comprises cleaving any S-protective groups present and dehydrogenating -SH groups to form S-S bonds to form a compound of the formula (II)

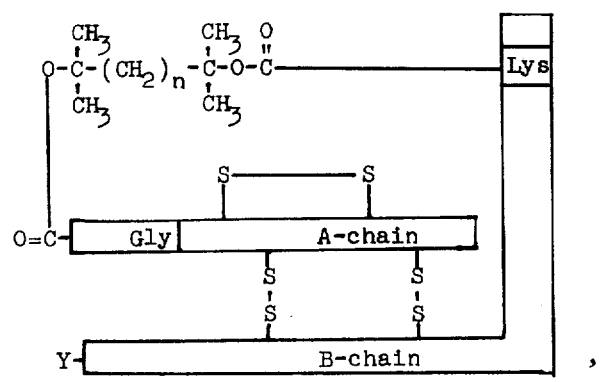

and then eliminating the

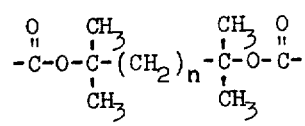

bridge by treating the latter compound with an acid. Compounds of the formula II.

2 Claims, No Drawings

PROCESS FOR THE MANUFACTURE OF INSULIN, ANALOGS AND DERIVATIVES THEREOF

The present invention relates to a process for the manufacture of insulin as well as the analogs and derivatives thereof, which comprises converting a compound of the general formula I

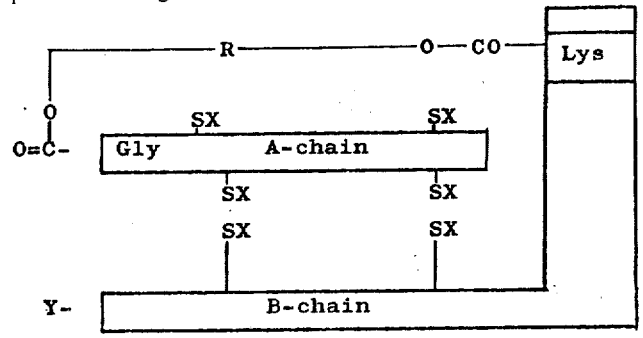

(I)

in which X stands for hydrogen or a S-protective group and Y stands for hydrogen, an alkanoyl radical of 1 to 4 carbon atoms, a phenyl-alkanoyl group of 1 to 3 carbon atoms in the alkanoyl moiety, benzoyl or an alkyloxy-carbonyl or arylalkyloxycarbonyl radical, the alkyl moiety containing 1 to 4 carbon atoms, an aminoacyl radical derived from naturally occurring α or β-amino acids or from the D-enantiomers thereof, or an acylaminoacyl radical, and R stands for a radical of the general formula II

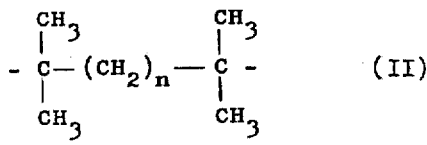

(II)

in which n stands for an integer of 2 to 4, by splitting-off of the radicals X and by dehydrogenation, into a compound of the general formula III

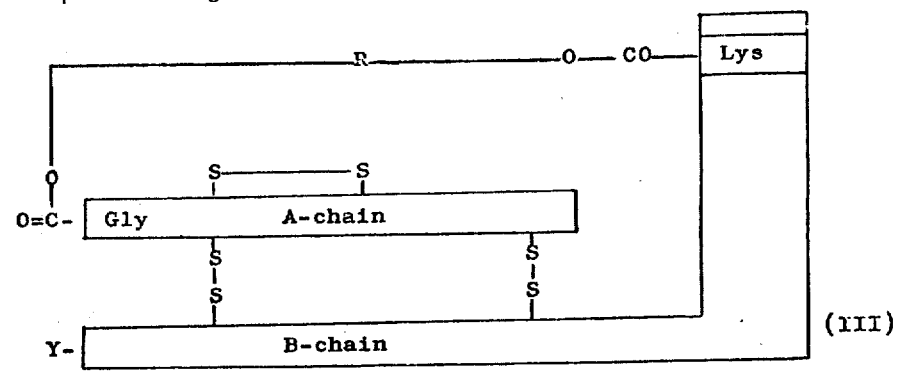

(III)

in which Y and R are defined as above, and eliminating the —CO—O—R—O—CO— bridge from this compound by treating it with an acid, for example trifluoroacetic acid.

This invention moreover relates to compounds of the general formulae I and III, in which R, X and Y are defined as above.

Intramolecular cross-linking of insulin by means of the two amino groups N-$^{\alpha A1}$ and N-$^{\epsilon B29}$ is already known from Makromol. Chem. 26, 153 – 166 (1958). Elucidation of the tertiary structure of insulin confirmed the short distance between the two amino groups capable of being bridged by means of bifunctional reagents. It has also been possible since then to link the two amino groups by means of a succinoyl or adipinoyl bridge. Thus, novel insulin derivatives have been obtained which, however, could not be reconverted into insulin.

In contradistinction thereto, the process of this invention offers the possibility of regenerating insulin from a molecule showing such an intramolecular cross-linking, since the —CO—O—R—O—CO— bridge can easily be eliminated by means of acid reagents, for example trifluoroacetic acid.

The process and the insulin derivatives of the invention corresponding to the general formula III are interesting inasfar as the products can be prepared with a high yield from separately snythesized A- and B-chains. In the combination of the two chains in a high dilution they take over the function held by the C-peptide during the biosynthesis of insulin, i.e. the function of bringing about a combination according to the formula.

The method of the chain combination which today is almost exclusively used according to Scientia Sinica 10, 84 (1961) affords a yield of about 10 percent under favorable conditions. About 40 percent thereof can be obtained in crystallized form. Some authors indicate higher yield which, however, have never been reproducible. The yield in combined chains could hitherto only be increased using the A-chain in an about 5-fold molar excess. Those reaction conditions are, however, no longer economic [Advances Enzymology 33, 455 (1970)] nor is the yield in crystallizable material satisfactory.

In contradistinction thereto, the process of the invention affords yields exceeding 25 percent with a chain ratio of 1:1. Moreover, products that have been combined in a wrong way can be subjected, after reduction, to another combination process since, in this case, the A- and B-chains are at first not altered when linked to each other by means of a bridge according to the invention.

Thus, the process of the invention is also suitable for an industrial-scale synthesis of insulin.

In addition to insulin itself, the process of the invention also allows insulin analogs and derivatives to be prepared.

By insulin analogs there are understood compounds in which one or more amino acids have been exchanged against other, preferably simpler, amino acids, furthermore insulins having a modified, preferably shortened, chain length.

For example, as already known in the art, in the A-chain Gln[5] and Gln[15] may be replaced by Glu, Ser[12], Tyr[14], Asn[18] and Asn[21] by Ala, Val[10] by Leu or another hydrophobic amino acid, furthermore Tyr[19] by Phe.

In the B-chain, Phe[1], Val[2], Asn[3], Gln[4], His[5], Ser[9], His[10], Thr[27] and Pro[28] may be replaced by simpler amino acids, preferably alanine. The amino acid 1 to 3 and 30 may also be eliminated. Even Cys[47] and Cys[87] may be replaced by Ala.

Insulin acid derivatives are understood to be compounds carrying substituted functional groups. For example, the α-amino group of the B-chain may be substituted by an acyl group in a manner analogous to German Offenlegungsschrift No. 2,042,299. The same applies to the above-defined insulin analogs, always provided that the replacement or substitution does not, or only to a minor extent, decrease the biological activity of the insulins.

The alcohols on which the bifunctional bridging reagents are based and which correspond to the formula

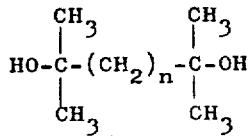

n being an integer of 2 to 4, are known. They are converted into the corresponding activated carbonic acid esters using chloroformic acid esters, nitrophenyl esters, trichlorophenyl esters, pentachlorophenyl esters, pentafluorophenyl esters or N-hydroxy-succinimide esters, preferably the easily obtainable nitrophenyl esters, though the other esters mentioned are equally useful.

Y may be an acyl radical easy to be split off, for example the trifluoroacetyl radical (TFA) which is eliminated by means of dilute NaOH, 0.1M piperidine or 1N NH$_3$, once the insulin synthesis is complete; Y may also be Boc or another acyl radical as mentioned in German Offenlegungsschrift No. 2,042,299, which is preserved after synthesis and yields a corresponding insulin derivative.

As S-protective groups X, there are used radicals which are already known, for example the trityl, diphenylmethyl, acetamidomethyl or tetrahydropyranyl radical, moreover alkylmercapto groups, such as ethylmercapto, isopropylmercapto or tert.-butylmercapto groups, and aminoethyl-carbamoyl protective groups according to German Offenlegungsschrift No. 1,930,330; furthermore, the ethyl-carbamoyl radical. Even the sulfo group may temporarily serve for the protection of SH-groups; it is, for example, eliminated by the action of excess mercapto compounds.

The process of the present invention is carried out, for example, by reacting an insulin A-chain sulfonate prepared according to known methods with an excess activated ester, for example 4-nitrophenyl ester of the following formula

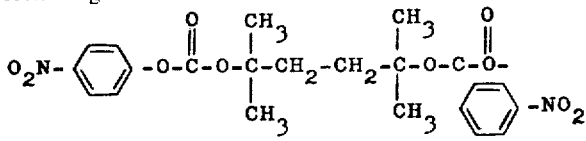

Suitable solvents are dimethyl formamide or dimethylsulfoxide. The reaction product is precipitated using an organic solvent, such as an ether or ethyl acetate and, as an intermediate, for example

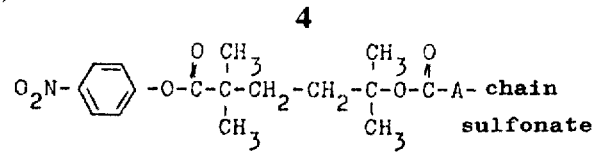

is obtained. This product is again dissolved, preferably in dimethylformamide, phosphoric acid tris-dimethylamide or dimethylsulfoxide, and the solution is reacted with an about equimolar amount of B-chain sulfonate in the presence of an amount of N-ethyl-morpholine or triethylamine which is sufficient for the neutralization of the acid groups, at a pH-value of from about 8 to 10, and of about 1 equivalent of 1-hydroxybenzotriazole. The ε-amino group is Lys[B29] of the B-chain used is free, the α-amino group of Phe[B1] may be protected, for example by means of a Boc-Gly, Boc-Ala or TFA radical. The preparation of such a chain is disclosed in Example 1(b).

After a reaction time of about 30 to 120 minutes at room temperature, the reaction product obtained is a sparingly soluble compound of the formula I, in which X stands for SO$_3^-$, R for

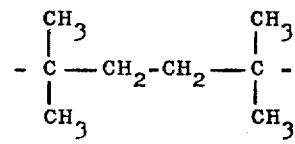

and Y for Boc.

The above-described linkage between A- and B-chains may also be brought about in an inverse order of succession.

The reaction product is then treated with ether and the dried substance is dissolved, where required upon purification by chromatography, in 8-M urea or water of pH 5 to 9. Under an atmosphere of nitrogen, a 10- to 500-fold excess of thioglycol or the 1- to 5-fold calculated amount of a trialkyl-phosphine, for example tributyl-phosphine, is added to 0 to 60°C, the mixture is precipitated at room temperature with a mixture of acetone in acetic acid after a reaction time of about 4 to 6 hours, centrifuged and washed several times with a mixture of acetone in acetic acid. The precipitate is dissolved in the lowest possible amount of aqueous NH$_3$ and the solution is diluted with 0.05M (NH$_4$)HCO$_3$, the pH of which has been adjusted to 10 to 10.6, to reach a peptide concentration of 0.01 to 1 mg/ml, and the mixture is stirred overnight at 0°-20°C in a slow air stream. The procedure may also be followed at a lower pH-value, for example 8 to 10, but the reaction times required are then prolonged to about 150 hours. The pH of the solution is then adjusted to 4 – 5.5 with 1N acetic acid and the solution is lyophilized or evaporated to dryness in vacuo.

For purification purposes, the product is chromatographed in 0.5 to 2N ammonium acetate at a pH of about 7.5 using Sephadex G 50 or G 75 in a column having a length of 1 to 2 m. The "insulin" peak is processed in the following manner, the product that has been combined in the wrong way being recycled to a recombination upon reduction.

The cross-linked crude insulin of the general formula III is treated for about 1 to 2 hours with 5 to 10 times its amount of trifluoroacetic acid at about 10° to 25°C, it is precipitated with ether, chromatographed in 1 to 2N acetic acid using a column containing Sephadex G-50 to G-75 and having a length of 1 to 2 m, and directly crystallized from the solution in the usual manner with the addition of Zn ions at pH 5.4 to 5.5. The yield of crystallized material is 15 to 25 percent of the theoretical yield (not including material which, if combined in the wrong way, has to be reduced).

Upon measuring the blood sugar lowering effect on rabbits, it was found that the biological activity of the crystallized insulin obtained according to the process of the invention is 23 I.U. per mg. Analysis of the amino acids is correct. It is used, instead of material recovered from the pancreas, for the treatment of diabetes mellitus.

Instead of the synthesis methods described in the following examples for A and B-chains with the aid of the Solid phase method, the known methods of fragment condensation, for example the carbodiimide method, where required with an addition of N-hydroxy-succinimide, 1-hydroxy-benzotriazoles, 3-hydroxy-3-oxo-3,4-dihydro-1,2,3-benzotriazine, or the azide method, may be applied for the manufacture of the A- and B-chains used as starting materials.

The following Examples illustrate the invention.

EXAMPLE 1
Bovine insulin a. A-chain S-tetrasulfonate (cattle)

The bovine insulin A-chain was prepared according to Hoppe Seyler's Z. Physiol. Chem. 352, 419 – 429 (1971), following the solid phase method and starting from polystyrene resin with a cross-linking rate of 1 percent. The first amino acid, namely asparagine, was esterified as Boc-Asn(Mbh)-OH (prepared from H-Asn(Mbh)-OH [cf. Chem. Ber. 103, 2041 – 2051 (1970), using Boc azide] with the hydroxy groups of the resin in known manner.

All the following amino acids were used as Boc amino acid 4-nitro-phenyl esters. Carboxyl groups in the side chains were present as benzyl esters, hydroxy groups of serine and tyrosine as benzyl ethers. The SH-group of cystein was protected by the S-tert.-butylmercapto group (cf. Peptides 1969, North Holland Publishing Comp., Amsterdam 1971, page 30).

Each condensation step was performed in the presence of 1-hydroxy-benzotriazole in a manner described in "Chemistry and Biology of Peptides" 343 (1972), in order to increase reaction speed and specificity.

When the synthesis was complete, the A-chain was split off from the resin in known manner by means of hydrogen fluoride and converted by sulfitolysis of the asymmetric disulfides according to Hoppe Seyler's Z-Physiol. Chem. 352, 419–429 (1971) into the S-tetra-sulfonate and then purified. The A-chain sulfonate prepared in this manner and purified (yield of synthesis 65. percent, yield of sulfitolysis 28 percent) could not be distinguished by electrophoresis from a compound prepared from natural insulin.

b. $N^{\alpha}$-Boc-B-chain S-disulfonate

The bovine insulin B-chain was prepared according to Hoppe Seyler's Z. Physiol, Chemie 348, 1355 (1967) and 352, 419 (1971), according to Merrifield [Biochemistry 3, 1385 (1964)] starting from polystyrene resin with a cross-linking rate 1 percent. Lysine was used as Boc-Lys(Pht)-ONp, all the other amino acids likewise as Boc-nitrophenyl esters, further carboxy groups in the side chains were present as benzyl esters according to the Merifield method, hydroxy groups of serine and tyrosine as benzyl ethers. The SH-group of cystein was protected by means of the S-tert.-butylmercapto group (cf. Peptides 1969, North Holland Publishing Comp., Amsterdam 1971, page 30).

Each condensation step was performed in the presence of 1-hydroxy-benzotriazole, in order to increase reaction speed and specificity.

When the synthesis was complete, the B-chain was split off from the resin in known manner by means of hydrogen fluoride. Yield: 55 percent, calculated on the first amino acid $Ala^{B30}$. 3.6 Grams (1 mmol) of the $N^{\epsilon}$-Pht-B-chain still S-protected were then reacted in 100 ml of dimethylformamide with 300 mg (1.2 mmols) of Boc-ONp during 1 hour at room temperature in the presence of 135 mg of 1-hydroxy-benzotriazole. After the solvent had been distilled off in vacuo until a volume of 10 ml was reached and, after ethyl acetate had been added, 3.5 g of Boc-S-tert.-butylmercapto-$N^{\epsilon}$ Pht-B-chain were obtained. For splitting off the phthaloyl group, the compound was dissolved in 100 ml of 80 percent phenol and, after addition of 4 ml of hydrazine hydrate, the solution was heated to 40°C for 16 hours. Subsequently, 3.3 g of the compound that had been freed from the phthaloyl group were precipitated by means of 1 l of isopropanol — ether (1 + 5). The compound was converted into the disulfonate according to Example 1 (a); yield: 3.0 g.

c. Preparation of a bridging reagent

A solution of 4.04 g of chloroformic acid 4-nitrophenyl ester in 10 ml of absolute dioxan was added dropwise while stirring at 0°C to a solution of 1.46 g of 2,5-dimethyl-n-hexane-diol-2,5 and 2.42 ml of N-methylmorpholine in 20 ml of absolute dioxan. After stirring had been continued for 2 hours at room temperature, the precipitate was separated by suctionfiltration and the filtrate was evaporated in vacuo. The residue was recrystallized from ethyl acetate/petrol ether. Yield: 2.10 g, m.p. 140° to 141°C (decomposition).

d. Bovine insulin

The pH-value of a solution of 2.8 g of the A-chain tetrasulfonate prepared according to (a) in 200 ml of dimethyl sulfoxide was adjusted to about 9 by means of N-ethylmorpholine and the solution was stirred with 1.9 g of the nitrophenyl ester prepared according to 1(c). After 20 hours, the mixture was precipitated with ether-methanol (10:1). 2.5 Grams of monoA-chain tetrasulfonate of 2,5-bis-hydroxycarbonyl-2,5-dimethyl-n-hexane mononitrophenyl ester were obtained. The product was taken up in 200 ml of dimethylsulfoxide, 3.0 g of $N^{\alpha}$-Boc-B-chain disulfonate prepared according to Example 1 (b), 120 mg of 1-hydroxy-benzotriazole and some triethylamine (up to pH 9) were added, and stirring was continued for 1 hour at room temperature. The mixture was then precipitated with ethermethanol (10:1). Yield 5.35 g After column chromatography using Sephadex G 50 (column length: 4 m, diameter: 4 cm) in 0.05M of $(NH_4)HCO_3$-buffer of pH 8.5 – 9, and lyophilization, the product (3.3 g) was taken up in 0.25 l of water of pH 8.6. 50 Milliliters of thioglycol were added, the mixture was stored for 6 hours under nitrogen, precipitated with 10 to 20 times its amount of acetone in acetic acid, centrifuged and freed from thioglycol by washing it with acetone in acetic acid. The mixture was then dissolved in a small amount of 1N $NH_3$, diluted to a volume of 25 l and its pH-value was adjusted to 9 by means of 1N $NH_3$, the mixture was stirred for about 100 hours at room temperature in a weak air stream, the pH-value was adjusted to about 4 to 5 by means of acetic acid, and the solution was lyophilized.

The residue was dissolved in 50 ml of 5 percent ammonium acetate (pH 7.5) and after filtration, it was chromatographed by means of a column having the size of 4 × 100 cm and containing Sephadex G-75, fine. The column was calibrated with insulin. After a preliminary peak (1.55 g) the peak of insulin (2.7 g) appeared. The preliminary peak was reduced with 1,4-dithiothreitol in liquid ammonia or with tributyl-phosphine in dilute aqueous ammonia at pH 8 – 10 according to J.Amer.-Chem.Soc. 93

(1971), page 3,080, and oxidized as above in 1.5 l of water at pH 9.

The 2.7 g of cross-linked crude insulin obtained upon chromatography were stored after drying for 2 hours in 20 ml of trifluoroacetic acid at 15°C. 2.2 Grams of crude insulin were precipitated with 200 ml of ether. After another purification operation by chromatography by means of Sephadex G-75 as disclosed above, an insulin fraction was obtained which precipitated in an amorphous form in the usual manner after addition of $ZnCl_2$ and adjustment of the pH to 5.4 but crystallized within 1 to 2 days. The crystals were cautiously separated from uncrystallized material by centrifuging, crystallization was repeated and 1.25 g (21%, calculated on A-chain material used) were obtained, comprising 23 to 24 I.U. per mg.

EXAMPLE 2

Des-(Phe-Val)$^{B1\text{-}2}$-des-Ala$^{B30}$-[Ala$^{A12,14,18,21}$] insulin (pig)

a. Ala$^{12,14,18,21}$-insulin A-chain S-tetrasulfonate (pig)

In a manner analogous to Example 1 (a), a pig's insulin A-chain was prepared according to the solid phase method, Boc-Ala-OH being esterified as the first amino acid (A 21) with the hydroxy groups of the resin. In the positions 18, 14 and 12, Boc-Ala-ONp groups were introduced instead of amino acids that hold these positions in the natural chain. The further course of synthesis and the work-up were the same as disclosed in Example 1 (a). Yield of synthesized material: 70 percent, that obtained by sulfitolysis: 30 percent.

b. N -Boc-des-(Phe-Val)$^{B1}$-des-Ala$^{B30}$-insulin B-chain S-disulfonate (pig)

The bovine insulin B-chain was prepared in a manner analogous to Hoppe Seyler's Z. Physiol. Chemie 348, 1355 (1967) and 352, 419 (1971), according to Merrifield [Biochemistry 3, 1385 (1964)], starting from polystyrene resin with a cross-linking rate of 1 percent. Lysine was used as Boc-Lys(Pht)-ONp, all the other amino acids also as Boc-nitrophenyl esters, further carboxy groups in the side chains were present as benzyl esters according to Merrifield, hydroxy groups of serine and tyrosine as benzyl ethers. The SH-group of cystein was protected by means of the S-tert.-butylmercapto group (cf. Peptides 1969, North Holland Publishing Comp., Amsterdam, 1971, page 30). The synthesis ended with Z-AsnONp$^{(B3)}$.

Each condensation step was performed in the presence of 1-hydroxy-benzotriazole.

When the reaction was complete, the B-chain was split off in known manner from the resin with hydrogen fluoride. Yield: 57 percent, calculated on the first amino acid Lys$^{B29}$.

3.6 Grams (1 mmol) of the N $^\epsilon$ -Pht-B-chain still S-protected were then reacted in 100 ml of dimethyl sulfoxide with 300 mg (1.2 mmols) of Boc-ONp in the presence of 135 mg of 1-hydroxybenzotriazole for 1 hour at room temperature. After the solvent had been distilled off in vacuo until a volume of 10 ml remained and ethyl acetate had been added, 3.5 g of the corresponding Boc-S-tert.-butylmercapto-N $^\epsilon$ -Pht-B-chain were obtained.

For splitting off the phthaloyl group, the compound was dissolved in 100 ml of 80 percent phenol and, after addition of 4 ml of hydrazine hydrate, the mixture was heated to 40°C for 16 hours. 3.3 Grams of the compound that had been freed from the phthaloyl group were then precipitated with 1 l of isopropanol - ether (1 + 5) and converted into the disulfonate as in Example 1 (a). Yield: 3.1 g.

c. Des-(Phe-Val)$^{B1\text{-}2}$-des-Ala$^{B30}$-[Ala$^{A12,14,18,21}$] insulin (pig)

The pH-value of a solution of 2.8 g of A-chain tetrasulfonate as prepared according to (a) in 200 ml of 90 percent dimethyl sulfoxide was adjusted to 9 by an addition of N-ethyl-morpholine and the solution was stirred with 2 g of the nitrophenyl ester as prepared according to Example 1 (c). After 20 hours, the mixture was precipitated with ethyl acetate or ether-methanol (10:1). 2.6 Grams of mono-A-chain tetrasulfonate of 2,5-bis-carbonyl-2,5-dimethyl-n-hexane mononitrophenyl ester (87 percent) were obtained. The compound was taken up in 200 ml of dimethylsulfoxide, 3.0 g of the B-chain disulfonate prepared in Example 2 (b), 120 mg of 1-hydroxy-benzotriazole and some triethylamine (up to pH 9) were added, and stirring was continued for 6 hours at room temperature. The mixture was precipitated again with ether-methanol (10:1). Yield: 5.3 grams.

The product was taken up in 0.25 l of water of pH 8.6. 50 Milliliters of thioglycol were added, the mixture was stored for 6 hours under nitrogen, precipitated with 15 times its amount of acetone in acetic acid, centrifuged and washed with the same solvent. The mixture was then dissolved in a small amount of 1N $NH_3$, diluted to a volume of 25 liters and the pH-value adjusted to 10 by means of 1N $NH_3$. The mixture was stirred for 20 hours at 10°C in a weak air stream, acetic acid was added until a pH of 5.5 was reached, and the solution was lyophilized.

The residue was dissolved in 50 ml of 5 percent ammonium acetate (pH 7.5) and after filtration chromatographed by means of a column having a size of 4 × 100 cm and containing Sephadex G-75, fine. The column was calibrated by means of insulin. After a preliminary peak (1.59 g) the peak of insulin appeared (2.59 g). The preliminary peak was reduced as in Example 1 and oxidized in 1.5 l of water as above at pH 10.6.

The 2.59 g of cross-linked crude insulin derivative obtained upon chromatography were stored, after drying, for 2 hours in 20 ml of trifluoroacetic acid at 15°C. 2.2 Grams of crude "insulin" were precipitated with 200 ml of ether. After another purification operation by chromatography using Sephadex G-75 an "insulin" fraction of 1.56 g (26 percent), calculated on A-chain material used, was obtained comprising about 20 I.U. per mg.

EXAMPLE 3

Des-phenylalanine$^{B1}$-insulin (cattle)

a. A-chain S-tetrasulfonate (cattle)

The compound was prepared in a manner analogous to Z. Naturforschung 24b, 1127–1139 (1969), showing the improvements described in Hoppe Seyler's Z. Physiol. Chem. 352, 2 (1971). The protective groups were split off, also the S-trityl groups, by dissolving the peptide in trifluoroacetic acid and pouring the solution into water after 1 hour. After filtration and extraction with ether, the product was lyophilized and converted into S-tetrasulfonate in a manner analogous to Z. Naturforschung 24b, 1138 (1969).

b. N $^\alpha$ -Boc-des-Phe$^1$-B-chain S-disulfonate (cattle)

Synthesis of the B-chain was carried out as in Example 1(b) and ended with Boc-Val.

When the synthesis was complete, the B-chain was split off in known manner from the resin by means of hydrogen fluoride. Yield: 55 percent, calculated on the first amino acid Ala$^{B30}$. 3.6 Grams (1 mmol) of N$^\epsilon$-Pht-B-chain still S-protected were then reacted in 100 ml of dimethylformamide with 300 mg (1.2 mmols) of Boc-ONp in the presence of 135 mg of 1-hydroxybenzotriazole during 1 hour at room temperature. After the solvent had been distilled off in vacuo until a volume of 10 ml remained and ethyl acetate had been added, 3.5 g of N$^\alpha$-Boc-S-tert.-butylmercapto-N$^\epsilon$-Pht-B-chain were obtained.

For splitting off the phthaloyl group, the compound was dissolved in 100 ml of 80 percent phenol, and after addition of 4 ml of hydrazine hydrate, the mixture was heated to 40°C for 16 hours. 3.3 Grams of the compound that had been freed from the phthaloyl group were then precipitated with 1 l of isopropanol-ether (1 + 5) and converted into the disulfonate as in Example 1 (a). Yield: 3.0 g.

c. Des-Phe$^{B1}$- insulin (cattle)

The pH-value of a solution of 2.8 g of A-chain tetrasulfonate prepared according to (a) in 200 ml of dimethylsulfoxide was adjusted to 9 by the addition of N-ethylmorpholine and the solution was stirred with 2 g of the nitrophenyl ester prepared according to Example 1 (c). After 20 hours, the mixture was precipitated with ether/methanol (10:1). 2.65 Grams of mono-A-chain tetrasulfonate of 2,5-bis-hydroxycarbonyl-2,5-dimethyl-n-hexane-mononitrophenyl ester were obtained. The product was again taken up in 200 ml of dimethyl sulfoxide, 3.0 g of N$^\alpha$-Boc-des-Phe$^1$-B-chain disulfonate prepared as in Example 3(b), 120 mg of 1-hydroxy-benzotriazole and some triethylamine (up to pH 9) were added, and stirring was continued for 6 hours at room temperature. The mixture was then precipitated with ether/methanol (10:1). Yield: 5.42 Grams.

The product was purified, reduced and dehydrogenated to yield cross-linked insulin in the manner described in Example 1.

The residue was dissolved in 50 ml of 5 percent ammonium acetate (pH 7.5) and, after filtration, chromatographed by means of a column having a size of 4 × 100 cm and containing Sephadex G-75, fine. The column was calibrated with insulin. After a preliminary peak (1.55 g), the insulin peak appeared (2.52 g). The preliminary peak was reduced as in Example 1 and oxidized in 1.5 l of water as above. The 2.52 g of cross-linked crude des-Phe$^{B1}$-insulin obtained upon chromatography were stored, after drying, for 2 hours in 20 ml of trifluoroacetic acid at 15°C. 2.28 Grams of crude "insulin" were precipitated with 200 ml of ether. After another purification by chromatography by means of Sephadex G-75 as above, an insulin fraction was obtained which precipitated in an amorphous form in the usual manner after an addition of ZnCl$_2$ and adjustment of the pH to 5.4 but crystallized in the course of 1 to 2 days. The crystals were cautiously separated from uncrystallized material by centrifuging, crystallization was repeated and 1.18 g of des-Phe$^{B1}$-insulin (cattle)(20 percent, calculated on A-chain material used) were obtained, comprising 23 to 24 I.U. per mg.

EXAMPLE 4

B1-acetyl insulin (pig)

a. A-chain S-tetrasulfonate (pig)

The preparation was analogous to Example 1 (a), the amino acid sequence of the pig's insulin A-chain being taken into regard. Yield upon synthesis: 68 percent, upon sulfitolysis: 32 percent.

b. B1-acetyl B-chain S-disulfonate

The chain was synthesized in a manner analogous to Example 1 (b) using, however, Lys as

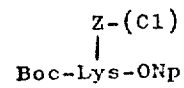

and Phe$^{B1}$ as N-acetyl-Phe-ONp.

When the synthesis was complete, the B-chain was split off in known manner from the resin by means of hydrogen fluoride. Yield: 59 percent, calculated on the first amino acid Ala$^{B30}$. The substance was converted into the disulfonate as in Example 1(a).

c. B1-acetyl insulin (pig)

The pH-value of a solution of 2.8 g of the A-chain tetrasulfonate prepared according to (a) in 200 ml of dimethylsulfoxide was adjusted to 9 by addition of N-ethyl-morpholine, and the mixture was stirred with 1.8 g of the nitrophenyl ester prepared according to Example 1(c). After 20 hours, the mixture was precipitated with ether/methanol (10:1). 2.65 Grams of mono-A-chain tetrasulfonate of 2,5-bis-hydroxycarbonyl-2,5-dimethyl-n-hexane-mononitrophenolate was obtained. This substance was again taken up in 200 ml of dimethylsulfoxide, 3.0 g of the N-acetyl B-chain disulfonate, prepared according to (b), 120 mg of 1-hydroxybenzotriazole and some triethylamine (up to pH 9) were added, and stirring was continued for 6 hours at room temperature. The mixture was then precipitated with ether/methanol (10:1). Yield: 5.45 g.

The product was purified, reduced and dehydrogenated to yield cross-linked insulin derivative as in Example 1.

The residue was dissolved in 50 ml of 5 percent ammonium acetate (pH 7.5) and, after filtration, chromatographed by means of a column having a size of 4 × 100 cm and containing Sephadex G-75, fine. The column was calibrated with insulin. After a preliminary peak (1.55 g) the insulin peak appeared (2.75 g). The preliminary peak was reduced as in Example 1 and oxidized in 1.5 l of water as above.

The 2.75 g of cross-linked crude insulin obtained above chromatography were stored for 2 hours in 20 ml of trifluoroacetic acid at 15°C. 2.0 Grams of crude insulin were precipitated with 200 ml of ether. After another purification by chromatography using Sephadex G-75 as above, an insulin fraction was obtained which precipitated in an amorphous form in usual manner after addition of ZnCl$_2$ and adjustment of the pH to 5.4 but crystallized in the course of some days. The crystals were cautiously separated from the uncrystallized material by centrifuging, crystallization was repeated and 1.05 g (17 percent), calculated on A-chain material used, were obtained comprising 22 to 24 I.U. per mg.

EXAMPLE 5
Human insulin a. A-chain S-tetrasulfonate (human)

Preparation analogous to Examples 1(a) and 4(a). Yield upon synthesis: 55 percent; upon sulfitolysis: 33 percent.

b. N$^\alpha$-Boc-B-chain S-disulfonate (human)

Synthesis analogous to Example 1 (b). As the first amino acid, however, Boc-Thr-OH was esterified with the hydroxy groups of the resin. Yield: 62 percent.

When the reaction was complete, the B-chain was split off in known manner from the resin by means of hydrogen fluoride. Yield: 58 percent, calculated on the first amino acid Thr$^{B30}$. 3.6 Grams (1 mmol) of the N$^\epsilon$-Pht-B-chain still S-protected were reacted in 100 ml of dimethylformamide with 370 mg (1.2 mmols) of Boc-ONp in the presence of 135 mg of 1-hydroxy-benzotriazole during 1 hour at room temperature. After the solvent had been distilled off in vacuo until a volume of 10 ml remained and ethyl acetate had been added, 3.5 g of Boc-S-tert.-butyl-mercapto-N$^\epsilon$-Pht-B-chain were obtained.

For splitting off the phthaloyl group, the compound was dissolved in 100 ml of 80 percent phenol and, after addition of 4 ml of hydrazine hydrate, the mixture was heated to 40°C for 16 hours. 3.3 Grams of the compound that had been freed from the phthaloyl group were then precipitated with 1 l of isopropanol/ether (1 + 5) and converted into the disulfonate as in Example 1 (a). Yield 3.0 g.

c. Human insulin

The pH-value of a solution of 2.8 g of the A-chain tetrasulfonate prepared according to (a) in 200 ml of dimethylsulfoxide was adjusted to 9 by adding N-ethyl-morpholine, and the mixture was stirred with 1.8 g of the nitrophenyl ester prepared according to Example 1(c). After 20 hours, the mixture was precipitated with ether/methanol (10:1). 2.6 Grams of mono-A-chain tetrasulfonate or 2,5-bis-hydroxycarbonyl-2,5-dimethyl-n-hexane-mononitrophenolate were obtained. The product was again taken up in 200 ml of dimethylsulfoxide, 3.0 g of the N$^\alpha$-Boc-B-chain disulfonate prepared according to Example 1(d), 120 g of 1-hydroxy-benzotriazole and some triethylamine (up to pH 9) were added, and stirring was continued for 6 hours at room temperature. The mixture was then precipitated with ether/methanol (10:1). Yield 5.58 g.

The product was purified, reduced and dehydrogenated to yield cross-linked insulin derivative as in Example 1.

The residue was dissolved in 50 ml of 5 percent ammonium acetate (pH 7.5) and, after filtration, chromatographed by means of a column having a size of 4 × 100 cm and containing Sephadex G-75, fine. The column had been calibrated with insulin. After a preliminary peak (1.6 g) the insulin peak appeared (2.45 g) after evaporation in vacuo. The preliminary peak was reduced as in Example 1 and oxidized in 1.5 l of water as above.

The 2.45 g of crude insulin derivative obtained upon chromatography were stored, after drying, for 2 hours in 20 ml of trifluoroacetic acid at 15°C. 2.25 Grams of crude insulin were precipitated with 200 ml of ether.

After another purification operation by chromatography using Sephadex G-75 as above, an insulin fraction was obtained which precipitated in an amorphous form in the usual manner after addition of ZnCl$_2$ and adjustment of the pH-value to 5.4 but crystallized in the course of 1 to 2 days. The crystals were cautiously separated from uncrystallized material by centrifuging, crystallization was repeated and 1.22 g (20 percent), calculated on A-chain material used, were obtained comprising 23 to 24 I.U. per mg.

What is claimed is:

1. A method for making an insulin compound of the formula

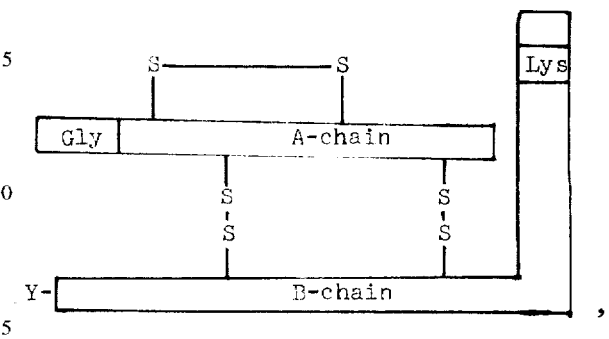

wherein Y is hydrogen, alkanoyl having 1 to 4 carbon atoms, phenyl-alkanoyl having 1 to 3 carbon atoms in the alkanoyl portion, benzoyl, alkyloxy-carbonyl or aralkyloxy-carbonyl having 1 to 4 carbon atoms in the alkyl portion, or aminoacyl derived from a naturally-occurring $\alpha$- or $\beta$-amino acid or from the D-enantiomer thereof, and biologically-active analogs thereof in which one or more amino acids have been exchanged for other, preferably simpler, amino acids or in which the chains are modified, preferably shortened, in length, which process comprises cleaving S-protective groups from a compound of the formula

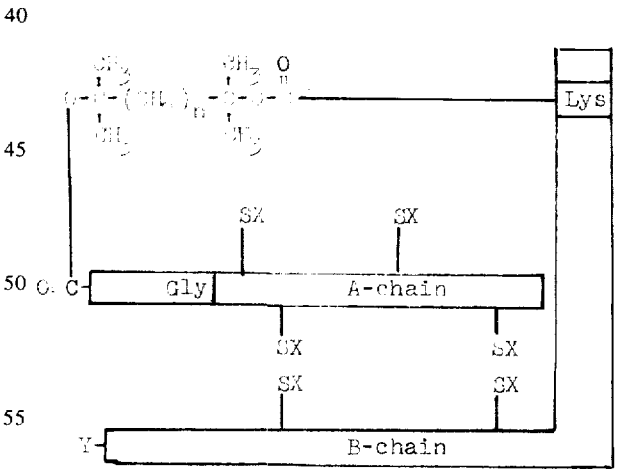

or analogs thereof in which one or more amino acids have been exchanged for other, preferably simpler, amino acids or in which the chains are modified, preferably shortened, in length, wherein X is hydrogen or an S-protective group and n is an integer from two to four, dehydrogenating -SH groups in the resultant product to form S-S bonds, whereby a compound of the formula

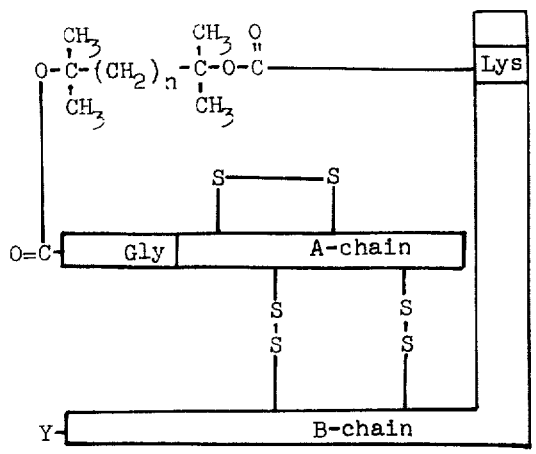

or an aforementioned analog thereof, is obtained, and then treating this compound with an acid to remove the

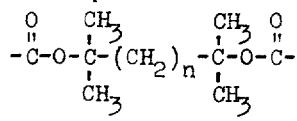

bridge therefrom.

2. An insulin compound of the formula

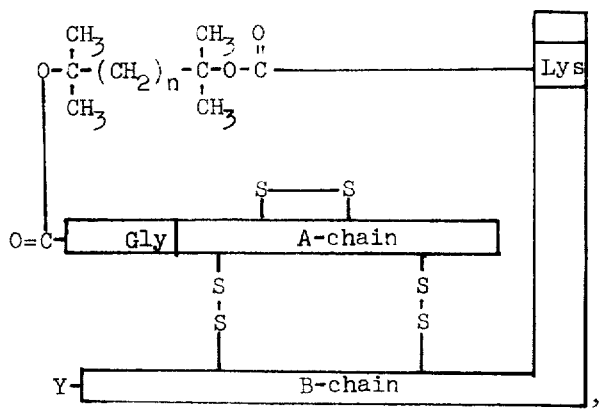

wherein $n$ is an integer from two to four and Y is hydrogen, alkanoyl having 1 to 4 carbon atoms, phenylalkanoyl having 1 to 3 carbon atoms in the alkanoyl portion, benzoyl, alkyloxy-carbonyl or aralkyloxy-carbonyl having 1 to 4 carbon atoms in the alkyl portion, or aminoacyl derived from a naturally-occurring α- or β-amino acid or from D-alanine.

* * * * *